United States Patent

Ho

(10) Patent No.: US 7,303,137 B2
(45) Date of Patent: Dec. 4, 2007

(54) DUAL INTEGRATED CIRCUIT CARD SYSTEM

(76) Inventor: Chun-Hsin Ho, 7F-1, No.180, Sec.2, Duen Hua South Rd., Taipei (TW) 106

( * ) Notice: Subject to any disclaimer, the term of this patent is extended or adjusted under 35 U.S.C. 154(b) by 44 days.

(21) Appl. No.: 11/294,575

(22) Filed: Dec. 6, 2005

(65) Prior Publication Data

US 2006/0175417 A1 Aug. 10, 2006

Related U.S. Application Data

(63) Continuation-in-part of application No. 11/051,857, filed on Feb. 4, 2005, now Pat. No. 7,198,199.

(51) Int. Cl.
*G06K 19/06* (2006.01)
(52) U.S. Cl. .................. 235/492; 235/449
(58) Field of Classification Search ........... 235/375, 235/379, 439, 440, 492, 441, 451, 486; 361/752; 705/51; 257/707, 686
See application file for complete search history.

(56) References Cited

U.S. PATENT DOCUMENTS

| | | | | |
|---|---|---|---|---|
| 5,296,692 A | * | 3/1994 | Shino | ...................... 235/486 |
| 5,434,395 A | * | 7/1995 | Storck et al. | ................ 235/380 |
| 6,029,892 A | * | 2/2000 | Miyake | ...................... 235/380 |
| 6,581,830 B1 | * | 6/2003 | Jelinek et al. | .............. 235/441 |
| 6,713,854 B1 | * | 3/2004 | Kledzik et al. | .............. 257/686 |
| 6,811,082 B2 | * | 11/2004 | Wong | ......................... 235/451 |
| 2003/0052176 A1 | * | 3/2003 | Nozawa et al. | ............. 235/492 |
| 2004/0054628 A1 | * | 3/2004 | de Jong et al. | ............... 705/51 |
| 2004/0129450 A1 | * | 7/2004 | Yamazaki et al. | ........... 174/250 |
| 2004/0139207 A1 | * | 7/2004 | de Jong | ...................... 709/229 |

\* cited by examiner

*Primary Examiner*—Thien Minh Le
(74) *Attorney, Agent, or Firm*—Bacon & Thomas, PLLC (57) ABSTRACT

A dual card system for a portable device and a fixed terminal machine is disclosed. The dual card system includes a first card having a first substrate and a first integrated circuit (IC) provided with a first plurality of contacts on a top surface of the first substrate, and a second card having a second substrate and a second IC provided with a second plurality of contacts on a top surface of the second substrate. The second substrate is provided with a first plurality of pins on a bottom surface thereof, to be electrically coupled with the first plurality of contacts, respectively.

24 Claims, 5 Drawing Sheets

DUAL INTEGRATED CIRCUIT CARD SYSTEM

CROSS-REFERENCE

The application is a continue-in-part (CIP) application of a co-pending U.S. application, Ser. No. 11/051,857, now U.S. Pat. 7,198,199 entitled "Dual Universal Integrated Circuit Card (UICC) System for a Portable Device", and filed on Feb. 4, 2005, which is incorporated herein by reference in its entirety.

FIELD OF THE INVENTION

The present invention relates to a user identity module of a dual integrated circuit card, applied to a wireless communication system or a financial transaction identity system. More specifically, the present invention relates to a subscriber identity module (SIM) application for an integrated circuit chip card, and can increase the add-on applications of the wireless communication. Further, the present invention can also simultaneously process the subscriber identity module application for an integrated circuit chip card and the identity module application for a smart card. The present invention is extensively applied to a financial credit transaction to improve convenience.

BACKGROUND OF THE INVENTION

Generally speaking, a smart card is extensively applied to two fields. One is the Subscriber Identity Module (SIM) in wireless communication, and another one is the identification system, such as the financial card, ATM card or health insurance card, etc. . . . A SIM card is used in a mobile communication device. A person who uses the wireless network system, such as GSM or CDMA system, has the SIM card issued by the related communication service company. The SIM card stores the user information, including the user's phone number, phone book, call restriction, personal identity number (PIN), personal unblock key (PUK), etc. . . . Further, an authentic SIM card is adopted by GSM communication system for communication, so that the user can be allowed to enter into the GSM communication network for transmitting information.

Generally, the SIM card is the so-called plug-in sized card, and the size is approximately 25 mm in length and 15 mm in width. Only the copper parts are actually used for connection. When the SIM card connects to a cellular phone, both of them have at least five junctions. The SIM card is composed of five parts including CPU, RAM, ROM, EEPROM or Flash and serial communication unit. The information stored in the SIM card includes (1) control channel information in a GSM system; (2) International Mobile Subscriber Identity (IMSI) and Temporary Mobile Subscriber Identity (TMSI); (3) user key and secret algorithm; (4) Personal Identification Number (PIN) and Personal Unlocking Key (PUK); and (5) SIM Tool Kit (STK).

With the wide-spread usage of smart cards in mobile industry such as SIM for GSM, USIM for WCDMA, RUIM for CDMA2000 and PIM for PHS network, a large variety of applications have been developed by utilizing Smart cards resided in the mobile phone (SIM/USIM/RUIM/PIM, hereafter referred as UICC, Universal Integrated Circuit Card) to provide security services. Mobile operators ensure the security of the use of mobile service by authenticating the keys stored in the Smart cards that mobile operators issued to the subscribers. In addition, mobile operators provide also premium services like mobile banking, mobile stock trading service by storing keys provided by the banks or other service providers in the SIM cards. The keys are manipulated through an application interface developed by SIM Tool Kit (STK) which is also resided in the SIM card itself. When WAP (Wireless Application Protocol) phones were available, WIM (Wireless Identity Module) was also developed by the SIM card vendors to secure WAP security by storing certificate and PKI algorithm in the SIM itself (SWIM card) or another standalone WIM card which can be inserted into another card slot in the mobile phone.

The keypad and display screen of the mobile phone facilitate the inserted smart card with great user interface and the mobile nature of remote access to service providers further accomplishes the goal of service mobility. In order to achieve the service mobility, service providers like banks, credit card issuers, transportation card issuers, certificate issuers and stock brokers are eagerly to cooperate with the mobile operator to issue enhanced SIM cards so as to provide services which fall into their professions. However, the provisioning and management of the SIM capability and functionalities are in control of the mobile operators therefore it forms a closed system where only agreed parties are allowed to participate. Furthermore, the relationship between service providers and mobile operators are one of mutual distrust and both have similar agendas over control of security and payment methods. This becomes the main obstacle to the development of mobile security services. Therefore, the present invention intends to resolve the above obstacles.

On the other hand, the traditional smart card is a ISO sized card, with 84 mm in length and 54 mm in width, and generally is applied in financial transaction system such as financial card, credit card, ATM card, or the identification system such as the health insurance card. Some smart cards include antennas surrounded within plastic cards to provide contactless application, called the contactless card, and are usually applied to the entrance control or the transition payment system, such as the Electronic Toll Collection (ETC) and metro fee collection. The forward communication equipment, such as the Automatic Vehicle Identification (AVI), the Automatic Vehicle Classification (AVC) and Video Enforcement System (VES), etc. adopted by the Electronic Toll Collection (ETC) detects and scans the On Board Unit (OBU) disposed in car, and vice versa, so that the users are automatically charged by the backward accounting service system without stopping and retarding when they pass through the toll station.

Figure 1:
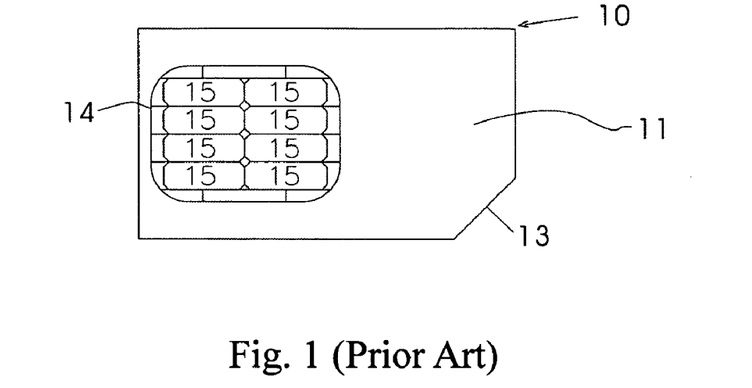
FIG. 1 is a diagram of an IC chip card according to the prior art.

FIG. 1 is a diagram of an IC chip card 10 according to the prior art. The IC chip card 10 has an IC chip 14, and the IC chip 14 is adhered to or embedded in a surface of a substrate 11. The substrate 11 includes an angled corner 13, for easy insertion of the IC chip card 10 into a portable device.

The IC chip card 10 includes eight contacts 15, but only six contacts 15 are used and connected to the portable device through conductive wires. The six contacts 15 are VCC (operating voltage), RST (reset), CLK (clock), GND (ground), VPP (programming voltage), and I/O (data input/output), respectively.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a dual card system includes a first card having a first substrate and a first integrated circuit (IC) provided with a first plurality of contacts on a top surface of the first substrate, and a second card having a second substrate and a second IC provided with a second plurality of contacts on a top surface of the second substrate. The second substrate is provided with a first plurality of pins on a bottom surface thereof, to be electrically coupled with the first plurality of contacts, respectively.

Preferably, either of the first card and second card includes a Subscriber Identity Module (SIM) card, universal SIM (USIM) card, User Identity Module (UIM) card and Removable User Identity Module (RUIM) card.

Preferably, the second card includes a security function such as WIM (WAP identification module) card or banking card while the first card includes a Subscriber Identity Module (SIM) card, universal SIM (USIM) card, User Identity Module (UIM) card and Removable User Identity Module (RUIM) card.

Preferably, either of the first card and second card includes a credit card, ATM card, easy card, debit card and stored value card.

Preferably, the first substrate has an opening at a place other than that of the first IC.

Preferably, the opening is provided with a plurality of protrusions along periphery thereof.

Preferably, the second card further includes an engagement portion.

Preferably, the engagement portion further includes a plurality of notches to correspondingly engage with the plurality of protrusions.

Preferably, the opening is provided with a plurality of notches along periphery thereof.

Preferably, the second card further includes an engagement portion.

Preferably, the engagement portion further includes a plurality of protrusions to correspondingly engage with the plurality of notches.

Preferably, further including an antenna detachably coupled to the second card.

Preferably, the antenna has an end clipped between the first card and the second card while the first and second card are engaged with each other.

Preferably, the antenna includes a laminated induction coil and a planar antenna.

Preferably, the first plurality is less than the second plurality.

Preferably, the first plurality is one half of the second plurality.

Preferably, the system can be applied to a cellular phone and a personal digital assistant (PDA).

Preferably, the system can be applied to a Automatic Teller Machine (ATM) and a Point of Sales (POS) card reader.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENT

The present invention discloses a dual integrated circuit (IC) card system for use with a communication terminal such as a mobile phone or personal digital assistant (PDA) or with a transaction terminal, i.e., a Automated Teller Machine (ATM) or Point of Sales (POS) card reader. The following description is to explain the above-mentioned applications.

First Embodiment

A first embodiment can be applied to a Subscriber Identity Module (SIM), Universal Subscriber Identity Module (USIM), User Identity Module (UIM) or Removable User Identity Module (RUIM), etc. . . . The characteristic of the present invention is that the structure includes a first substrate and a second substrate, and a first and second IC chips are loaded thereon, respectively. The second IC chip is coupled to contacts of a first IC chip card. The second IC chip is utilized to control, store and perform the add-on functions. The second IC chip can reform the responding signal from the first IC chip to a portable communication device to perform the add-on functions, such as an additional subscription and a post-issued SIM tool kit (STK) application, i.e., mobile bank, mobile stock trading, etc..

Figure 2:
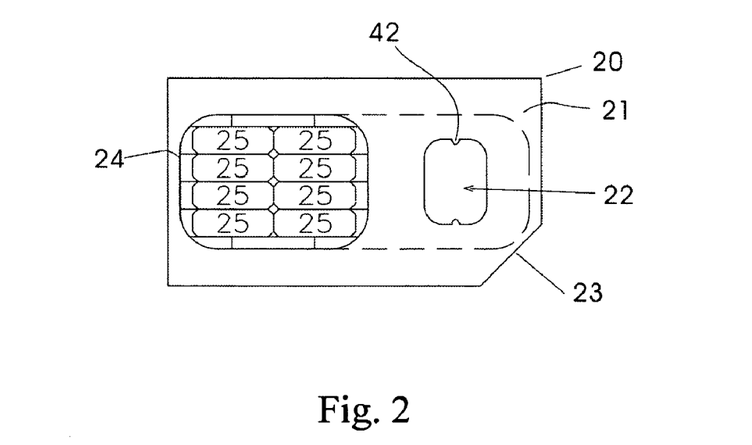
FIG. 2 is a diagram of a first IC chip card according to a first embodiment of the present invention.

FIG. 2 is a diagram of a first IC chip card according to the present invention. The first IC chip card 20 has a first IC chip 24, and the first IC chip 24 includes a plurality of contacts 25. The above-mentioned first IC chip 24 is attached to or embedded in the surface of a first substrate 21 and positioned within an area 26. The first substrate 21 includes a cut corner 23 for precisely guiding insertion into the first IC chip card 20 carrier or holder in a portable communication device.

When the first IC chip card 20 contacts with the contact pins of the portable communication device, the first IC chip card 20 can access the information stored in the first IC chip card 20. Moreover, the first IC chip card 20 has an opening 22 for accommodating the second IC chip 34 disposed on a second substrate 37. In the first embodiment, there are a plurality of protrusions 42 formed along the edges of the opening 22 to hold the second IC chip 34. Further, the protrusions 42 are configured but not limited to be along the upper and lower edges of the opening 22. They could be formed along the left and right edges of the opening 22 as well. The first IC chip 24 includes eight contacts 25, but the number of the contacts is not limited to eight.

In addition to a Subscriber Identity Module (SIM), a person skilled in the art can understand that the present invention is also utilized to a Universal Subscriber Identity Module (USIM), User Identity Module (UIM) or Removable User Identity Module (RUIM), etc.

In this embodiment, the first substrate 21 can be made of a plastic material similar to that of a credit card. The thickness of the first substrate 21 is preferably in the range between 0.76 mm and 0.8 mm. The size, material and shape of the first IC chip card 20 comply with the standard of the Subscriber Identity Module (SIM) card.

Figure 3A:
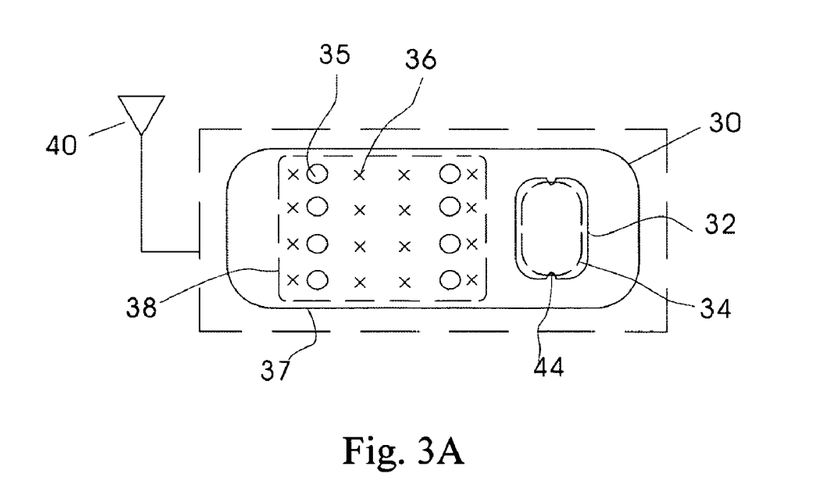
FIG. 3A illustrates a front side of a second IC chip card according to a first embodiment of the present invention.
Figure 3B:
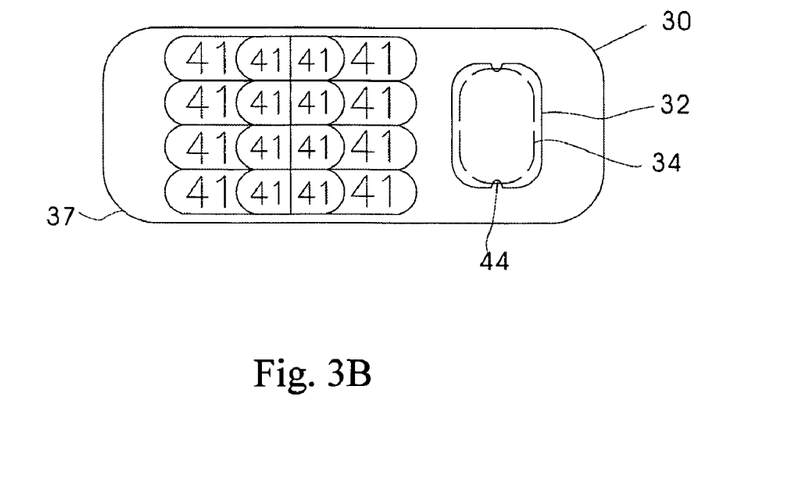
FIG. 3B illustrates a back side of a second IC chip card according to a first embodiment of the present invention.

FIG. 3A illustrates a front side of a second IC chip card 30 according to the first embodiment of the present invention. The second IC chip card 30 includes a second substrate 37 having the second IC chip 34 coupled to an antenna 40. The position of the antenna 40 can be disposed as shown in FIG. 3A. The second IC chip 34 has a protruding bump or package 32. Further, a groove 44 is provided separately on either the upper or lower edge of the protruding bump or package 32 and engaged with the protrusion 42 disposed on the opening 22 of the first IC chip card 20, so that the first IC chip card 20 can tightly connect with the second IC chip card 30. It is appreciated that both of the grooves 44 and the protrusion 42 are configured to correspond with each other. Therefore, the grooves 44 are configured at the upper and lower edges of the protruding bump or package 32, and they could also be formed at the right and left edges of the protruding bump or package 32. Moreover, the size of the protruding bump or package 32 substantially is consistent with the size of the opening 22. Similarly, the sizes and positions of both grooves 44 on the protruding bump or package 32 and those of protrusion 42 on the opening 22 also correspond with each other. FIG. 3B illustrates a rear side of a second IC chip card 30 according to the first embodiment of the present invention. A plurality of contact pins 41 are included in the rear side of the second IC chip card 30.

Moreover, the second IC chip 34 can be a flip chip attached to or embedded in the surface of the second IC chip card 30. The second IC chip card 30 can be a flexible printed circuit board or a hard printed circuit board. Further, in this embodiment, the flexible circuit board is adopted. In the first embodiment, the second IC chip 34 is attached to or embedded in the second substrate 37, such as a Laminate Circuit Board (LCB). The second IC chip card 30 includes a signal I/O area 38. The signal I/O area 38 includes a plurality of pins 35 and a plurality of through holes 36, in order to layout wires for coupling with the first IC chip 24 for transmitting signals to a portable device, such as a mobile phone. Referring to FIG. 3A, the pins 35 are indicated by the "○" symbols and the through holes 36 are indicated by the "x" symbols. For example, the signal I/O area 38 includes eight pins 35 and fourteen through holes 36, but the present invention is not limited by the numbers. Furthermore, the second IC chip 34 also includes a memory, such as a Electrically Erasable Programmable Read-Only Memory (EEPROM) or a flash memory for storing information, such as advanced phone books, short messages, etc. . . .

Figure 4A:
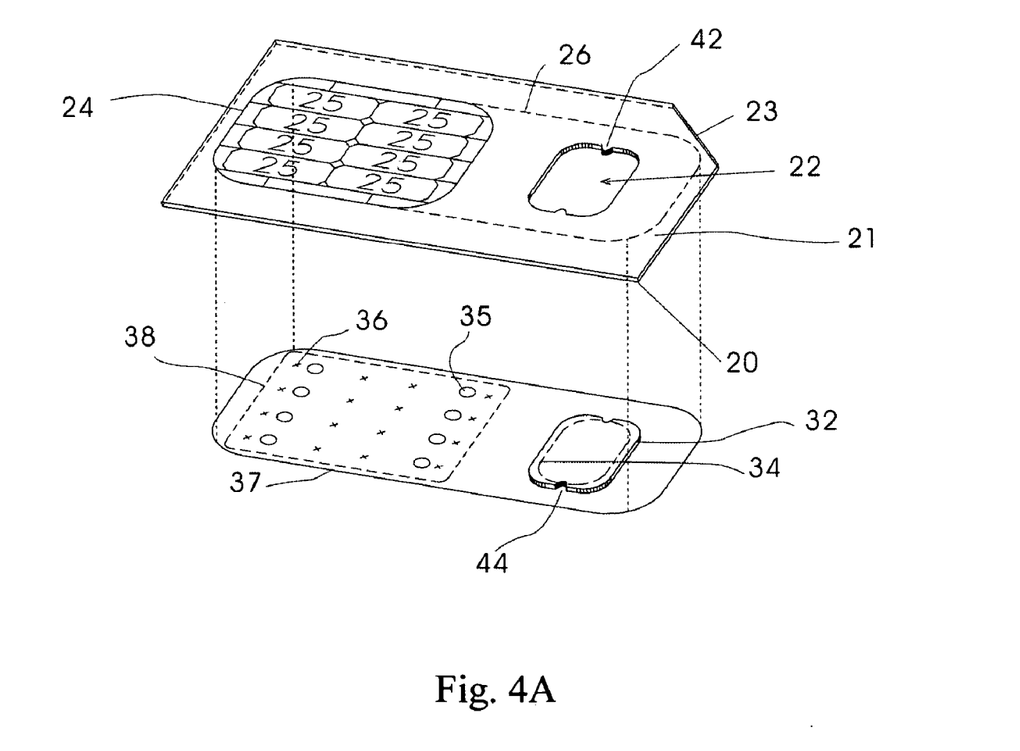
FIG. 4A is a perspective top view of the combination of the first and second IC chip card according to a first embodiment of the present invention.
Figure 4B:
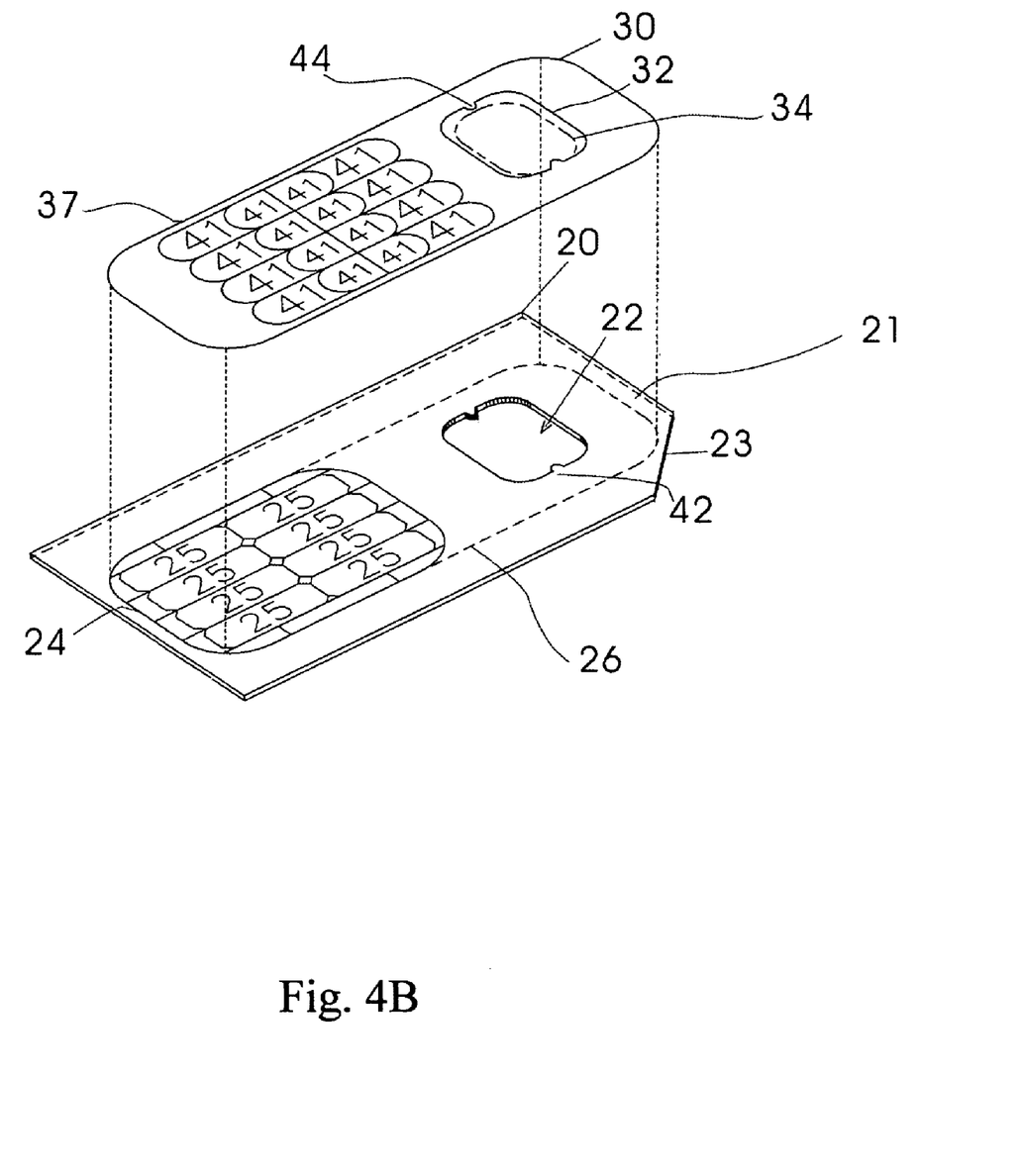
FIG. 4B is a perspective bottom view of the combination of the first and second IC chip card according to a first embodiment of the present invention.

FIG. 4A is a perspective top view of the combination of the first and second IC chip card 20 according to the first embodiment of the present invention. FIG. 4B is a diagram of the combination of the first and second IC chip card 20 and 30 according to the first embodiment of the present invention. When the protrusion 42 of the opening 22 of the first IC chip card 20 is aligned with the groove 44 of the protruding bump or package 32 of the second IC chip card 30, the first IC chip 24 of the first IC chip card 20 can be contacted directly or indirectly with the signal I/O area 38 of the second IC chip card 30, and a plurality of contacts 25 on the first IC chip 24 can be contacted with the pins 35 and the through holes 36 within the signal I/O area 38 to establish I/O connection. The contact pins 41 are a contact interface for communicating between mobile service system and second IC chip 34, and similarly, the contact interface is also for communicating between contactless trade service system and second IC chip 34. Therefore, the through holes 36 within the signal I/O area 38 as shown in FIG. 4A are redirected to the contacts 25 of the first IC chip 24, respectively, as shown in FIG. 4B.

In the first embodiment, the first IC chip card 20 is a SIM, and a person skilled in the art can understand that the first IC chip card 20 can also be a USIM, RUIM or PIM card.

Figure 5:
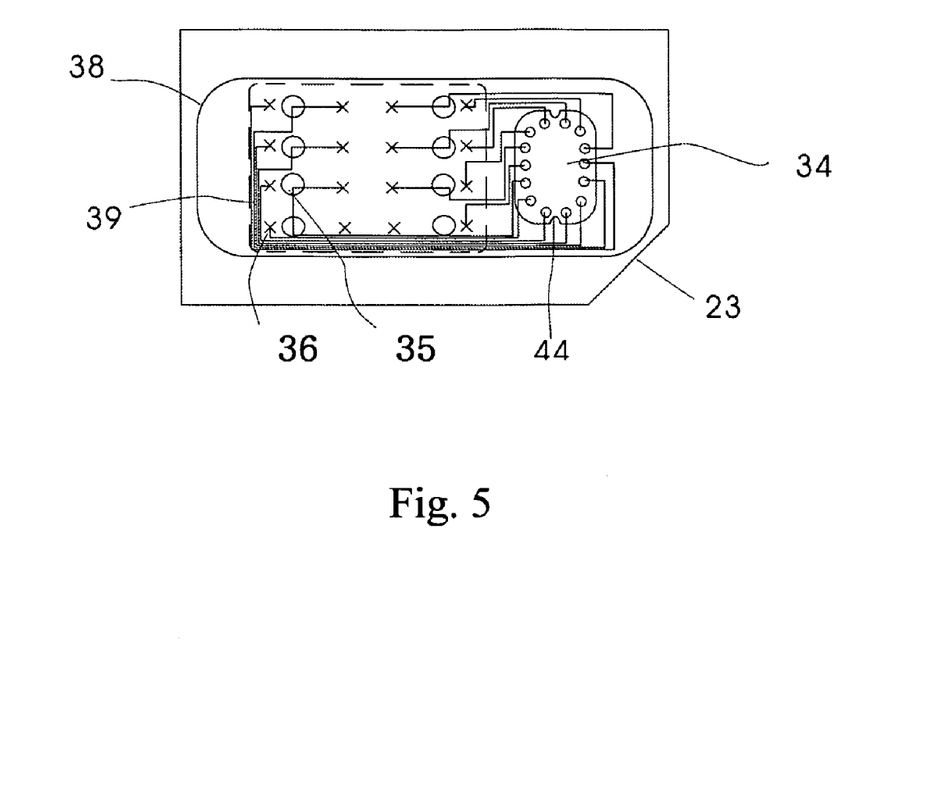
FIG. 5 is a perspective rear view of the combination of the first and second IC chip card and the arrangement of the wires according to a first embodiment of the present invention.

FIG. 5 shows a perspective rear view of the combination of the first and second IC chip card 20 and 30. The first IC chip card 20 and the second IC chip card 30 are directly contacted with each other. The signal I/O area 38 is directly contacted with the first IC chip 24, and the second IC chip 34 is electrically connected with the pins 35 and the through holes 36 of the signal I/O area 38 by a plurality of wires 39, respectively. The wires 39 electrically couple to the first IC chip card 20, and further connects with a portable device, such as a mobile phone and a personal digital assistant (PDA).

The arrangement and layout of the wires 39 can be changed and modified according to different conditions, and the present invention is not limited by the embodiments disclosed herein and hereinafter. Thus, in FIG. 5, the arrangement of the pins 35, through holes 36 and wires 39 is only illustrative and is not used to limit the present invention. In the first embodiment, the eight pins 35 in the center portion of the I/O area 38 are respectively connected to the eight through holes 36 at the left and right sides, and subsequently connected to the pins of the second IC chip 34. Therefore, the first IC chip 24 can communicate with the second IC chip 34 via the pins 35 and the through holes 36 on the laminate circuit board 37.

Figure 6:
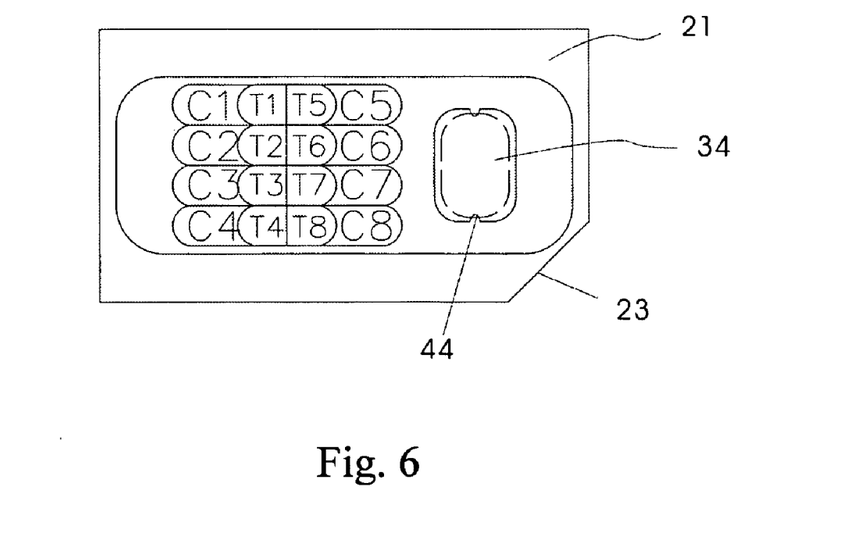
FIG. 6 is a diagram of the combination of the first and second IC chip card having a plurality of contact pins according to a first embodiment of the present invention.

FIGS. 5 and 6 show the arrangement of the signal contact pins according to the first embodiment of the present invention. The pins 35 and through holes 36 at both sides of the signal I/O area 38 are respectively redirected and coupled to the contact pins C1, C2, C3, C4, C5, C6, C7 and C8 of the second IC chip 34. The pins 35 located at the substantial middle portion of the signal I/O area 38 are respectively redirected and coupled to the contact pins T1, T2, T3, T4, T5, T6, T7 and T8 via through holes 36 at the inner sides of the I/O area 38, as shown in FIG. 6.

Moreover, the present invention is different from the smart card having eight pins. On the contact interface of the second IC chip card 30, the present invention provides sixteen pins, C1~C8 and T1~T8. The contact pins C1~C8 are the same as those of a conventional smart card. The contact pins T1~T8 are additionally provided by the present invention. A card reader or a portable device can communicate directly with the first IC chip card 20 without the control of the second IC chip card 30 by the use of contact pins T1~T8 of the present invention. Furthermore, the contact pins T1~T8 may be used to test I/O communication between the second IC chip 34 and the first IC chip 24 during shipment of the second IC chip 34. In the first embodiment, the contact pins T1~T8 and the contact pins C1~C8 of the second IC chip card 30 are substantially parallel.

Therefore, when the first IC chip card 20 contacts with the second IC chip card 30, the information of the first IC chip 24 can be stored and controlled by the second IC chip 34. That is to say, the second IC chip card 30 can control the first IC chip card 20.

In the first embodiment, when the first IC chip card 20 engages with the second IC chip card 30, the adhesion material can be applied between both of the IC chip cards for improving the adhesion therebetween.

The laminate circuit board 37 contacts with the contacts 25 of the first IC chip card 20, thereby allowing the second IC chip 34 to directly communicate with a portable device. That is, the second substrate 37 of the second IC chip card 30 may directly contact to the pins of the portable device.

Besides, the portable device can directly control the second IC chip card 30 to perform some functions. According to the application of the second IC chip 34, the second IC chip card 30 can analyze and control the communication between the pins of the portable device and the first IC chip card 20, and reform the responding signals from the first IC chip card 20 to the pins of the portable device to perform the add-on applications, such as the registration and switching of the second wireless communication number, the post-issued Subscriber Identity Module (SIM) Tool Kit applications (e.g., mobile bank, mobile stock or perform security functions of a WAP Identity Module (WIM)), etc. The SIM/UIM/UICC/RUIM Application Tool Kit applications of the first IC chip card 20, which is normally issued by the mobile operator, can be integrated by the second IC chip card 30 with its own ones, such as applications developed by the bank, stock broker, PKI Certificate Authority (CA) or the second wireless Mobile Operator.

Second Embodiment

A second embodiment can be applied to a fixed terminal machine, such as a Automated Teller Machine (ATM) or a Point of Sales (POS) card reader. In this embodiment, a first IC chip card can be a smart card 43a. The smart card 43a includes but not limited to a credit card, ATM card, debt-credit card, and stored value card. A second IC chip card 30a has a signal receiver device, generally a planar antenna. It is appreciated that most elements of the present invention are substantially similar with those of the first embodiment, and the detailed description thereof is omitted.

Figure 7:
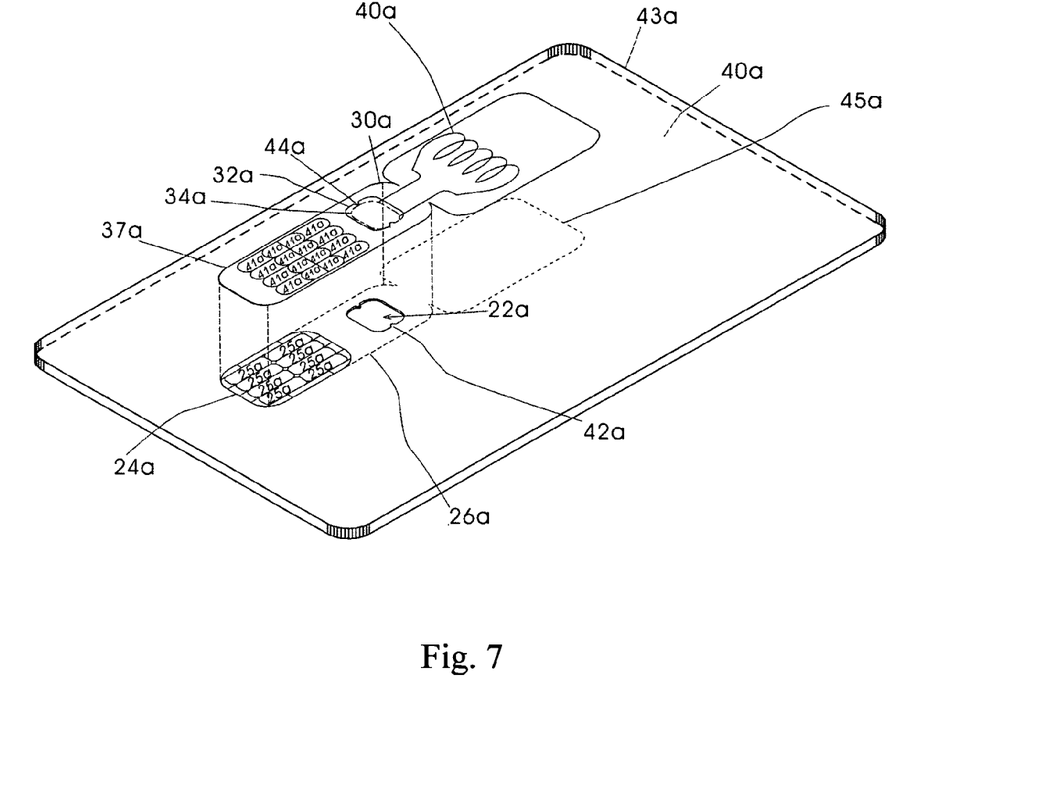
FIG. 7 is a perspective diagram of the combination of a smart card and an IC chip card according to a second embodiment of the present invention.

FIG. 7 is a perspective diagram of the engagement of the smart card 43a and the second IC chip card 30a according to the second embodiment of the present invention. The smart card 43a is generally called an "ISO sized card" and the size thereof is substantially similar to that of a ATM card or a credit card. The smart card 43a has a first IC chip 24a and an opening 22a within an area 26a. There is a protrusion 42a provided at either of the upper and lower edges of the opening 22a, respectively, corresponding to a groove 44a on either of the upper and lower sides of a protruding bump or package 32a of the second IC chip card 30a for holding the smart card 43a and the second IC chip card 30a together. Furthermore, the protrusions 42a are disposed at the upper and lower edges of the opening 22a, but they could be arranged at the left and right ends of the opening 22a as well.

Referring to FIG. 7, the second IC chip card 30a includes a second IC chip 34a. The second IC chip 34a is a flip chip attached to or embedded in the surface of the second IC chip card 30a. The second IC chip card 30a also includes a substrate 37a, such as a flexible printed circuit board or a hard printed circuit board. In this embodiment, the flexible circuit board is adopted. In the second embodiment, the second IC chip 34a is attached to or embedded in the substrate 37a, such as a Laminate Circuit Board (LCB). The IC chip card 30a has on one side a plurality of pins and through holes (not shown), and on the other side a plurality of contact pins 41a, substantially as shown in FIGS. 3A and 3B.

In the second embodiment, the smart card 43a can be a credit card, ATM card, debt-credit card or stored value card. Accordingly, the smart card 43a can be applied to a Automated Teller Machine (ATM) or a Point of Sales (POS) card reader.

In the second embodiment, when the smart card 43a engages with the second IC chip card 30a, the adhesion material can be applied between both of the cards for improving the adhesion therebetween.

On the other hand, the smart card 43a can be coupled to an antenna 40a and functioned for the near field electrical wireless trade or identification. The antenna 40a can be a laminate induction coil antenna or a planar antenna. In the second embodiment, the arrangement of the antenna 40a is not limited by the above-mentioned description, and therefore, the shape and type of the antenna can be changed to meet various requirements. When the smart card 43a is combined with the second IC chip card 30a, the planar antenna can be disposed within an antenna disposition region 45a of the smart card 43a.

According to the present invention, the following table shows the relationship between the identity modules and the communication system protocols as well as the nomination of the toolkit.

| Communication system protocol | Tool kit | Identity module |
| --- | --- | --- |
| GSM | STK | SIM |
| CDMA2000 | UTK | RUIM |
| WCDMA | USAT | USIM |
| PHS | | PIM |

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

The invention claimed is:

1. A dual card system, comprising: a first card having a first substrate and a first integrated circuit (IC) provided with a first plurality of contacts on a top surface of said first substrate; and a second card having a second substrate and a second IC provided with a second plurality of contacts on a top surface of said second substrate;

wherein said second substrate is provided with a first plurality of pins on a bottom surface thereof, to be electrically coupled with said first plurality of contacts, respectively;

wherein said first substrate has an opening at a place other than that of said first IC, and said opening is provided with a plurality of protrusions along a periphery thereof.

2. The dual card system according to claim 1, wherein either of said first card and second card comprises a Subscriber Identity Module (SIM) card, universal SIM (USIM) card, User Identity Module (UIM) card or Removable User Identity Module (RUIM) card.

3. The dual card system according to claim 1, wherein said second card is a WAP identification module (WIM).

4. The dual card system according to claim 1, wherein either of said first card and second card comprises a credit card, ATM card, easy card, debit card or stored value card.

5. The dual card system according to claim 1, wherein said second card further comprises an engagement portion.

6. The dual card system according to claim 5, wherein said engagement portion further comprises a plurality of notches to correspondingly engage with said plurality of protrusions.

7. The dual card system according to claim 5, further comprising an antenna detachably coupled to said second card.

8. The dual card system according to claim 7, wherein said antenna has an end clipped between said first card and said second card while said first and second card are engaged with each other.

9. The dual card system according to claim 7, wherein said antenna comprises a laminated induction coil and a planar antenna.

10. The dual card system according to claim 1, wherein said system can be applied to a cellular phone or a personal digital assistant (PDA).

11. The dual card system according to claim 1, wherein said system can be applied to an Automatic Teller Machine (ATM) or a Point of Sales (POS) card reader.

12. A dual card system, comprising: a first card having a first substrate and a first integrated circuit (IC) provided with a first plurality of contacts on a top surface of said first substrate; and a second card having a second substrate and a second IC provided with a second plurality of contacts on a top surface of said second substrate;

wherein said second substrate is provided with a first plurality of pins on a bottom surface thereof, to be electrically coupled with said first plurality of contacts, respectively; and wherein said first substrate has an opening at a place other than that of said first IC, and said opening is provided with a plurality of notches along periphery thereof.

13. The dual card system according to claim 12, wherein said second card further comprises an engagement portion.

14. The dual card system according to claim 13, wherein said engagement portion further comprises a plurality of protrusions to correspondingly engage with said plurality of notches.

15. The dual card system according to claim 13, further comprising an antenna detachably coupled to said second card.

16. The dual card system according to claim 15, wherein said antenna has an end clipped between said first card and said second card while said first and second card are engaged with each other.

17. The dual card system according to claim 15, wherein said antenna comprises a laminated induction coil and a planar antenna.

18. The dual card system according to claim 12, wherein either of said first card and second card comprises a Subscriber Identity Module (SIM) card, universal SIM (USIM) card, User Identity Module (UIM) card or Removable User Identity Module (RUIM) card.

19. The dual card system according to claim 12, wherein said second card is a WAP identification module (WIM).

20. The dual card system according to claim 12, wherein either of said first card and second card comprises a credit card, ATM card, easy card, debit card or stored value card.

21. The dual card system according to claim 12, wherein said system can be applied to a cellular phone or a personal digital assistant (PDA).

22. The dual card system according to claim 12, wherein said system can be applied to a Automatic Teller Machine (ATM) or a Point of Sales (POS) card reader.

23. A dual card system, comprising:

a first card having a first substrate and a first integrated circuit (IC) provided with a first plurality of contacts on a top surface of said first substrate; and a second card having a second substrate and a second IC provided with a second plurality of contacts on a top surface of said second substrate;

wherein said second substrate is provided with a first plurality of pins on a bottom surface thereof, to be electrically coupled with said first plurality of contacts, respectively; and wherein said first plurality is less than said second plurality.

24. The dual card system according to claim 23, wherein said first plurality is one half of said second plurality.

* * * * *